United States Patent [19]
Uchida

[11] Patent Number: 5,463,262
[45] Date of Patent: Oct. 31, 1995

[54] ROTOR FOR SYNCHRONOUS MOTOR

[75] Inventor: Hiroyuki Uchida, Yamanashi, Japan

[73] Assignee: Fanuc, Ltd., Yamanishi, Japan

[21] Appl. No.: 133,165

[22] PCT Filed: Feb. 26, 1993

[86] PCT No.: PCT/JP93/00248

§ 371 Date: Oct. 25, 1993

§ 102(e) Date: Oct. 25, 1993

[87] PCT Pub. No.: WO93/17483

PCT Pub. Date: Sep. 2, 1993

[30] Foreign Application Priority Data

Feb. 28, 1992 [JP] Japan ..................... 4-042523

[51] Int. Cl.[6] ..................... H02K 21/12
[52] U.S. Cl. ..................... 310/156; 310/162; 310/261
[58] Field of Search ..................... 310/156, 181, 310/162, 261, 114

[56] References Cited

U.S. PATENT DOCUMENTS

| | | |
|---|---|---|
| 4,469,970 | 9/1984 | Neumann . |
| 4,543,506 | 9/1985 | Kawada ..................... 310/156 |
| 4,618,792 | 10/1986 | Yates . |
| 5,010,266 | 4/1991 | Uchida ..................... 310/156 |
| 5,091,668 | 2/1992 | Cuenot ..................... 310/156 |
| 5,140,211 | 8/1992 | Ucida ..................... 310/156 |
| 5,157,297 | 10/1992 | Uchida ..................... 310/156 |

FOREIGN PATENT DOCUMENTS

| | | |
|---|---|---|
| 0104830 | 4/1984 | European Pat. Off. . |
| 0107317 | 5/1984 | European Pat. Off. . |
| 53-11008 | 1/1978 | Japan . |
| 63-99749 | 5/1988 | Japan . |
| 63-198372 | 12/1988 | Japan . |
| 3-74151 | 3/1991 | Japan . |

Primary Examiner—R. Skudy
Attorney, Agent, or Firm—Nikaido Marmelstein Murray & Oram

[57] ABSTRACT

A rotor of a synchronous motor, according to the present invention, includes a plurality of permanent magnets 12 radially arranged around a rotating shaft 10, and a plurality of laminated core members 14 arranged around the rotating shaft 10 and holding each permanent magnet 12 therebetween so as to constitute magnetic poles. Each permanent magnet 12 extends, as a continuum, along the substantially axial entire length of the laminated core members 14. Each laminated core member 14 is separated into two parts by a circular-plate member 24 disposed at generally center position of the laminated construction. The circular-plate member 24 is provided with a shaft hole 26 at the center thereof, into which the rotating shaft 10 is fitted, and a plurality of magnet-fastening holes 28 around the shaft hole 26. The magnet-fastening holes 28 have peripheral edges 32 with substantially the same profile as a cross-section of the permanent magnets 12, and are formed at the positions substantially corresponding to the positions of the permanent magnets 12. Therefore, each permanent magnet 12 is fastened at a predetermined position in a radial direction by the magnet-fastening hole 28 of the circular-plate member 24, against an external force acting radially outwardly such as centrifugal force.

9 Claims, 5 Drawing Sheets

ROTOR FOR SYNCHRONOUS MOTOR

TECHNICAL FIELD

The present invention relates to a rotor for a synchronous motor, and more particularly to a rotor for a synchronous motor which includes a plurality of permanent magnets radially arranged around a rotating shaft, a plurality of laminated core members arranged around the rotating shaft so as to hold each magnet between the core members in a circumferential direction and so as to form magnetic poles, and fastening means for fastening each magnet at a predetermined radial position between adjacent core members.

BACKGROUND ART

A rotor for a synchronous motor, which includes a plurality of permanent magnets radially arranged around a rotating shaft, and a plurality of laminated core members arranged around the rotating shaft so as to hold each magnet between the core members in a circumferential direction and so as to form magnetic poles, has already been known. In such rotor, the permanent magnets and the laminated core members are generally supported as follows: annular end plates are fixed to the rotating shaft and arranged at the axial both ends of the permanent magnets and the laminated core members, each laminated core member is fixedly held in the rotor by a rod member which extends through the core member and is connected to the end plates at both ends of the rod member, and then, each permanent magnet is positioned and fixedly supported in a radial direction by outer and inner hooks which are formed respectively at outer and inner periphery of side surfaces of adjacent laminated core members.

When the rotor having such a structure is used for a high-speed synchronous motor or a high-torque synchronous motor formed by axially connecting the rotors to one another, the rotating shaft and the rod members may be radially outwardly bent by centrifugal force or bending torque caused by reaction of an object to be driven. As a result, the balance of a rotor is deteriorated and the distance between the outer circumferential surfaces of the laminated core members and the inner circumferential surfaces of a stator surrounding the rotor is varied, possibly causing a cogging torque to be generated and the laminated core members to be brought into contact with the stator.

A solution has been provided such that a reinforcing member, used for preventing the rod members from being bent by external force, is incorporated into, e.g., the rotor for a high-torque synchronous motor. An example of this kind of rotor is illustrated in FIGS. 6a and 6b. The rotor includes two core assemblies 2 axially adjacent to each other and fixed to a common rotating shaft 1. Each core assembly 2 has a plurality of permanent magnets 3 and laminated core members 4. Rod members 5 extend successively through the laminated core members of both core assemblies 2, and are connected to end plates 6 at the each end of the rod members. Disc member 7 including a shaft hole, into which the rotating shaft 1 is inserted, and rod supporting holes, into which the rod members 5 are inserted, is arranged between the core assemblies 2. Each laminated core member 4 is provided with an outer hook 8 and an inner hook 9 for supporting the permanent magnet 3. The circular-plate member 7 is a reinforcing member for fixedly and mechanically retaining the rod members 5 against external force, and thus maintaining the rigidity of the rotor.

In the above-mentioned conventional rotor, the outer peripheral surface of each laminated core member is formed bulgingly along a predetermined arc, so that the magnetic flux in the gap between the inner peripheral surface of a stator and the outer peripheral surface is distributed in a sinusoidal curve relative to a rotation angle. Therefore, in the case where a small number of the magnetic poles or laminated core members is used, or where the thickness of the permanent magnets is small, idealizing the arc form of the outer peripheral surface of the laminated core member may mean that the outer peripheral surface of the permanent magnet cannot be covered with the distal end of the arc, and thus making it difficult to form the outer hook. In the above-mentioned conventional rotor, however, the fixing of the permanent magnets particularly in a radial direction depends on the outer hooks provided to the laminated core members. Consequently, in this case, in order to ensure the structural reliability of the rotor, the outer hooks are formed more or less at the sacrifice of obtaining the ideal sinusoidal-curve distribution of the magnetic flux. Such a formation of the outer hooks deteriorates the rotor performance by, e.g., a cogging torque.

DISCLOSURE OF THE INVENTION

The object of the present invention is to provide a rotor for a synchronous motor having the structure described in the head of this description wherein, even when the outer hooks for holding the permanent magnets cannot be formed on the laminated core members, a plurality of permanent magnets can be fixedly retained against radially outwardly acting external force, and thus to provide a rotor for a synchronous motor having high rigidity, good balance, and high reliability.

To accomplish the above object, the present invention provides a rotor for a synchronous motor, comprising a rotating shaft; a plurality of permanent magnets radially arranged around the rotating shaft, and extending in an axial direction; a plurality of laminated core members formed by axially stacking magnetic thin-plate cores, and arranged around the rotating shaft while holding each permanent magnet therebetween so as to constitute magnetic poles; a pair of end plates arranged at axial both ends of the permanent magnets and the laminated core members, and fixed to the rotating shaft; a plurality of rod members passing through each of the laminated core members in the axial direction, and connected to the end plates at both ends of the rod members; and a fastening means for fastening the permanent magnets between adjacent laminated core members at predetermined positions in a radial direction; wherein the fastening means includes at least one circular-plate member arranged at a predetermined position in a laminated construction of the laminated core members; the circular-plate member being provided with a shaft hole into which the rotating shaft is fitted, rod-supporting holes arranged around the shaft hole, into which the rod members are inserted, and magnet-fastening holes arranged between adjacent rod-supporting holes, into which the permanent magnets are inserted; the magnet-fastening holes being formed in and passing through the circular-plate member while having peripheral edge portions adapted to abut on at least radial outer surface of the permanent magnets at positions substantially corresponding to the permanent magnets.

When the circular-plate member is arranged at a predetermined position in a laminated construction of the laminated core members, the permanent magnets pass through the respective magnet-fastening holes of the circular-plate member. At this time, the peripheral edge portions of the magnet-fastening holes abut on at least the radial outer surface of the permanent magnets. When the rotating shaft is fitted in this state, the circular-plate member is retained in a radial direction by an engagement between the shaft hole and the rotating shaft, and the deflection of the permanent magnets in a radial outward direction is prevented by the peripheral edge portions of the magnet-fastening holes of the circular-plate member.

According to the preferred embodiment of the present invention, the circular-plate member may be made of a non-magnetic material. Further, the circular-plate member may be arranged at positions dividing the laminated construction of the laminated core members into some equal parts. In this case, the circular-plate member may also be arranged at generally center position in the axial direction of the laminated construction of the laminated core members. Preferably, the magnet-fastening holes of the circular-plate member have peripheral edges with substantially the same profile as a cross-sectional shape of the permanent magnets perpendicular to an axis of the permanent magnets.

The permanent magnets may have a length slightly projecting from axial both end faces of the laminated core members, and the fastening means may further include a plurality of fastening recesses formed in each of the end plates so as to receive the end portions of the permanent magnets while defining peripheral walls adapted to abut on at least the radial outer surfaces of the end portions, at positions substantially corresponding to each of the permanent magnets. The fastening means may further include fastening hooks projecting from side surfaces, being in contact with the permanent magnets, of the laminated core members by inner edges of the laminated core members in a circumferential direction.

Each of the permanent magnets may be formed as a continuum extending along generally axial entire length of the laminated core members. Alternatively, each of the permanent magnets may be divided in each of the magnet-fastening holes of predetermined circular-plate member arranged in the laminated core members. Further, an impregnent may be impregnated into the gaps between several components of a rotor core assembly constructed of a combination of the permanent magnets, the laminated core members, the end plates, the rod members, and the at least one circular-plate member.

BRIEF DESCRIPTION OF THE DRAWINGS

The foregoing and the other objects, features, and advantages of the present invention will be described with relation to the embodiments shown in the accompanying drawings, in which;

FIG. 6b is a sectional view taken along line b—b of FIG. 6a.

BEST MODE OF CARRYING OUT THE INVENTION

Figure 1:
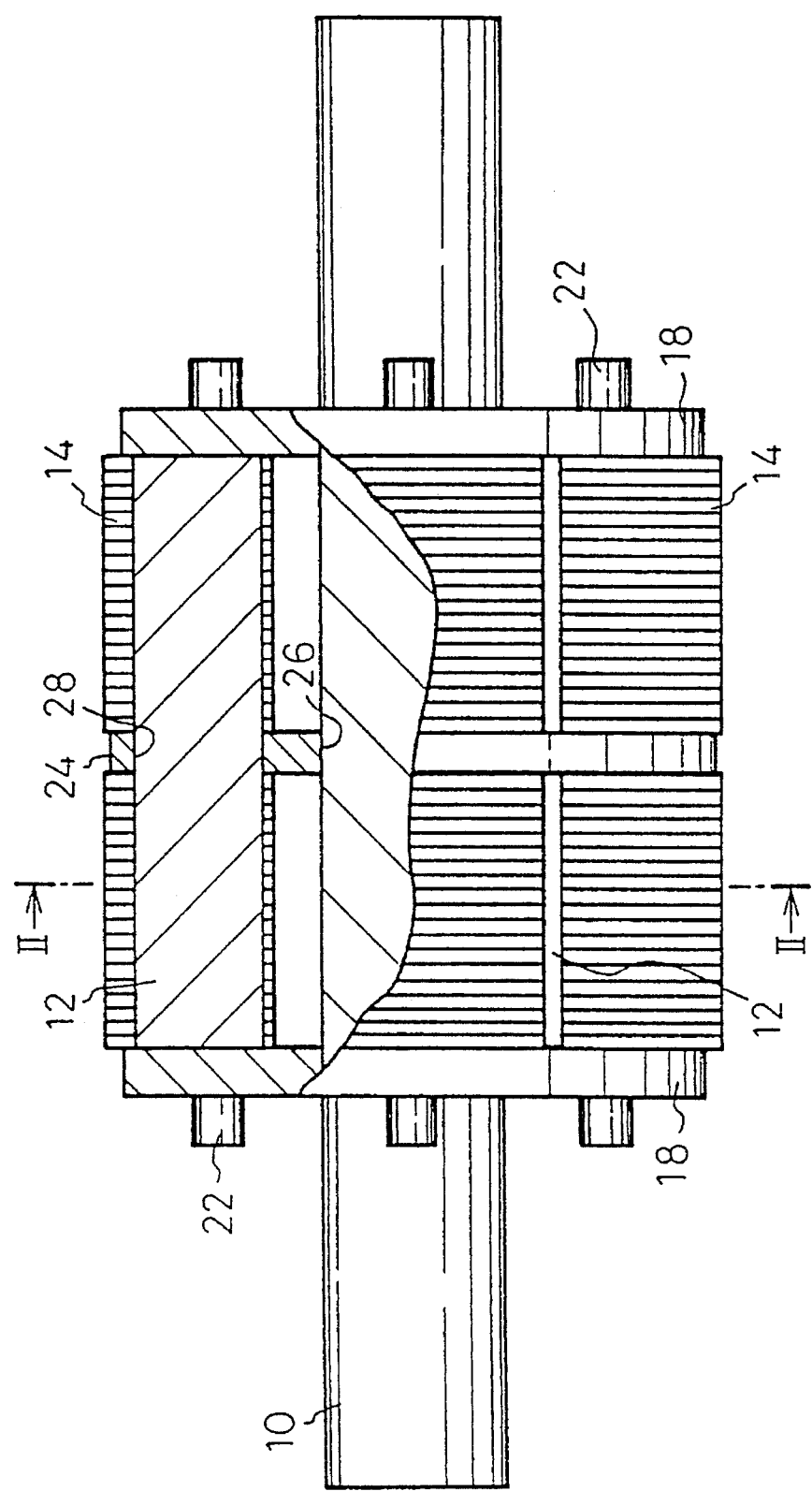
FIG. 1 is a partial sectional side view of a rotor according to the first embodiment of the present invention, taken along line I—I of FIG. 2.
Figure 2:
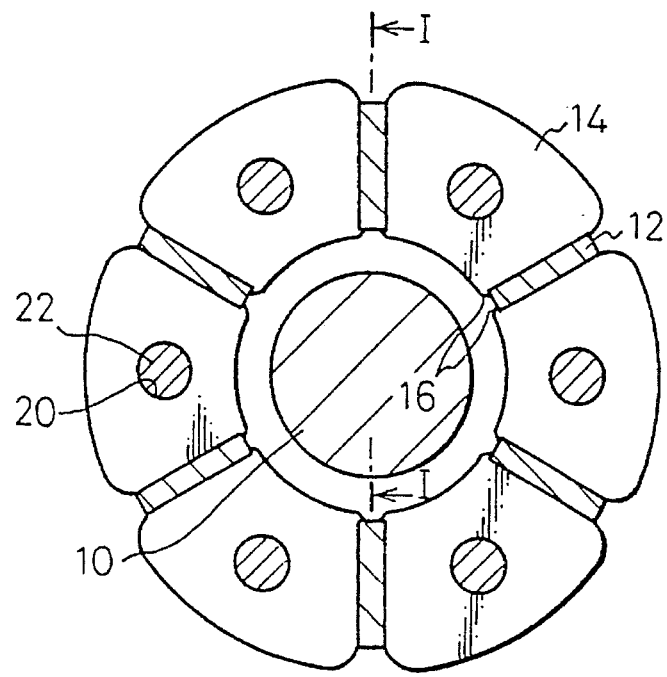
FIG. 2 is a sectional view taken along line II—II of FIG. 1.

Referring to the drawings, FIGS. 1 and 2 show a rotor for a synchronous motor according to the first embodiment of the present invention. The rotor includes a rotating shaft 10, six permanent magnets 12 radially arranged around the rotating shaft 10, and six laminated core members 14 arranged between each of the permanent magnets 12. A gap C is provided between the shaft 10 and magnets 12, as shown in FIGS. 1 and 2. Each permanent magnet 12 extends, as a continuum, along substantially the entire axial length of the laminated core members 14. Each laminated core member 14 is formed by axially stacking thin-plate cores of silicone steel plates with generally sector shape, and constitutes a magnetic pole through which the magnetic flux from the permanent magnet 12 passes. The side surface of each laminated core member 14 is in close contact with the side surface of adjacent permanent magnet 12. Each laminated core member 14 is provided with inner hooks 16 projecting from portions of the side surfaces near the inner edges of the core member in a circumferential direction. In this rotor, the laminated core members 14 include no outer hook, because the thickness of the permanent magnets 12 is small (see FIG. 2).

Annular end plates 18 are arranged at axial both ends of the permanent magnets 12 and the laminated core members 14. Each of the end plates 18 is fixed to the rotating shaft 10 by, e.g., a shrinkage fitting process. Further, each laminated core member 14 is provided with a through hole 20 (FIG. 2) axially passing through the generally center of the core member, and a rod member 22 is inserted into each through hole 20. Each rod member 22 passes through the bores (not shown) formed in the end plates 18 at the position aligned to the through hole 20 of each laminated core member 14, so as to be fixed to the end plates 18 at both ends of the rod member.

Figure 3:
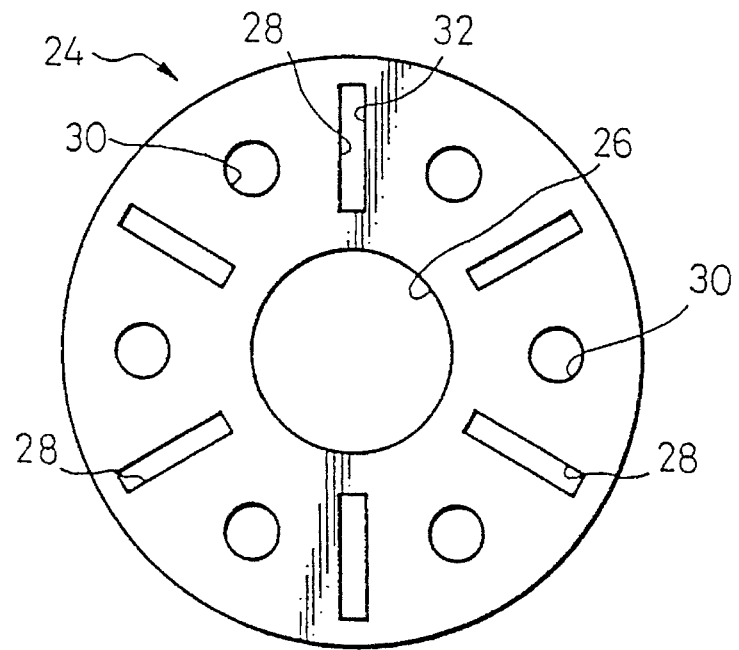
FIG. 3 is a front view of a circular-plate member of a rotor shown in FIG. 1.

As shown in FIG. 1, each laminated core member 14 is separated into two parts by a circular-plate member 24 disposed at generally the center position of the laminated construction. The circular-plate member 24 is preferably made of a non-magnetic material, such as a stainless steel. As shown in FIG. 3, the circular-plate member 24 is provided with a shaft hole 26 at the center thereof, into which the rotating shaft 10 is fitted, six magnet-fastening holes 28 around the shaft hole 26, into which the permanent magnets are inserted, and six rod-supporting holes 30 between the adjacent magnet-fastening holes 28, into which the rod members 22 are closely fitted.

The inner diameter of the shaft hole 26 is substantially equal to the outer diameter of the rotating shaft 10, thereby the circular-plate member 24 is fixedly supported in a radial direction by the rotating shaft 10 in the laminated construction of the laminated core members 14.

The magnet-fastening holes 28 have rectangular peripheral edges 32 with substantially the same profile as a cross-sectional shape of the permanent magnets 12 perpendicular to the axis of the magnets, and are formed at the positions substantially corresponding to the positions of the six permanent magnets 12 in the rotor. Therefore, each permanent magnet 12 held between the laminated core members 14 passes through each magnet-fastening hole 28 of the circular-plate member 24, and thus being fastened at a predetermined position in the radial direction by the magnet-fastening hole 28. Consequently, the permanent magnets 12 are fixedly supported against the external force acting radially outwardly, by the circular-plate member 24.

The rod-supporting holes 30 are formed at the positions substantially corresponding to the positions of the rod member 22 in the rotor. Therefore, each rod member 22 passes at the generally axial center thereof through each rod-supporting hole 30 of the circular-plate member 24, and thus being supported in the radial direction by the circular-plate member 24. In this manner, the laminated core members 14 are fixedly supported through the rod members 22 by the end plates 20 and the circular-plate member 24.

As mentioned above, because the magnet-fastening holes 28 have rectangular peripheral edges 32 with substantially the same profile as a cross-sectional shape of the permanent magnets 12, it becomes possible in this rotor to omit the inner hooks 16 of the laminated core members 14 if desired. As a result, the magnetic leakage between the different magnetic poles due to the inner hooks 16 are eliminated, and the magnetic properties of the rotor are improved by forming the circular-plate member 24 from non-magnetic material.

Preferably, the above-mentioned rotor is subjected to a resin impregnating process for mutually fixing the members, as usual, before the rotating shaft 10 is fitted. In this manner, the permanent magnets 12 and the laminated core members 14 are surely fixed in the radial and circumferential directions, and thus providing a rotor for a synchronous motor with a high rigidity.

Figure 6A:
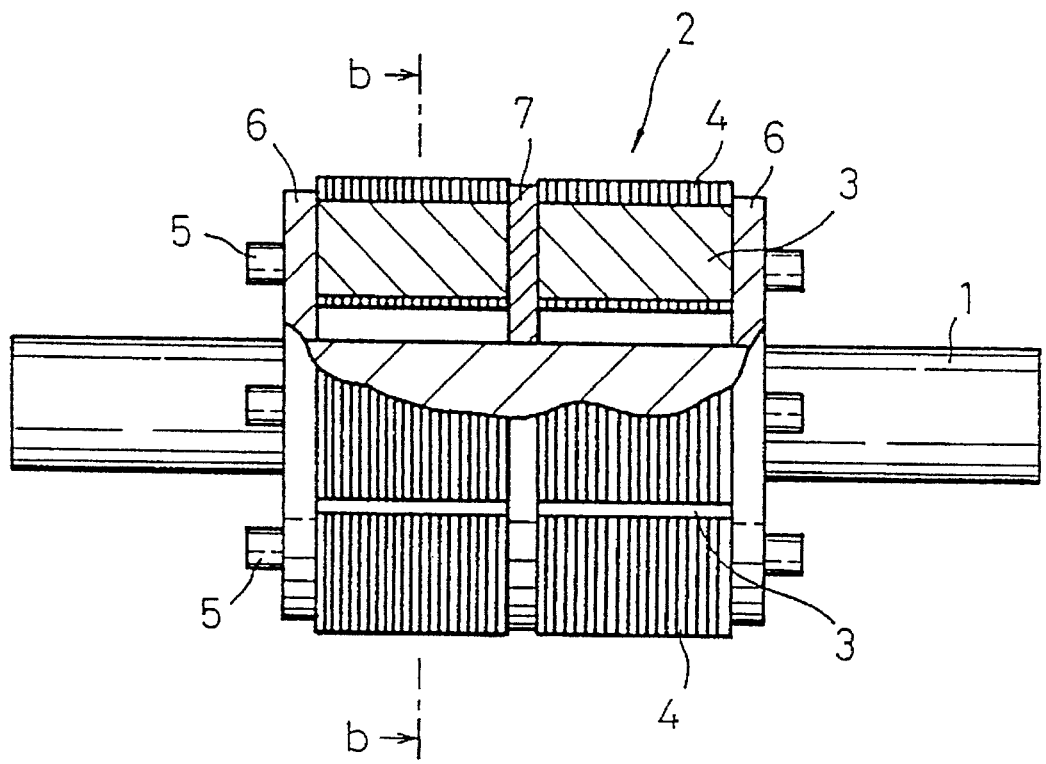
FIG. 6a is a partial sectional side view of a conventional rotor, taken along line a—a of FIG. 6b.
Figure 6B:
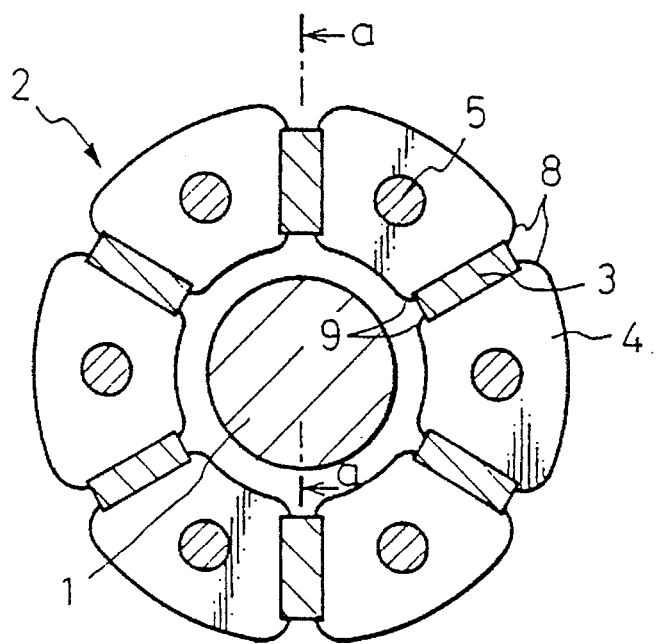

Further, as shown in the drawings, the above-mentioned rotor may be considered to be a high-torque type rotor, such as a conventional rotor shown in FIG. 6a, in which permanent magnets are formed by axially connecting the permanent magnets 3 and extend along two core assemblies 2 each having a basic size (axial length). Therefore, according to the present invention, it becomes possible to reduce the number of the permanent magnets 12 in the high-torque type rotor. Thus, the rotor of the present invention also has the effect of reducting manufacturing costs.

Figure 4:
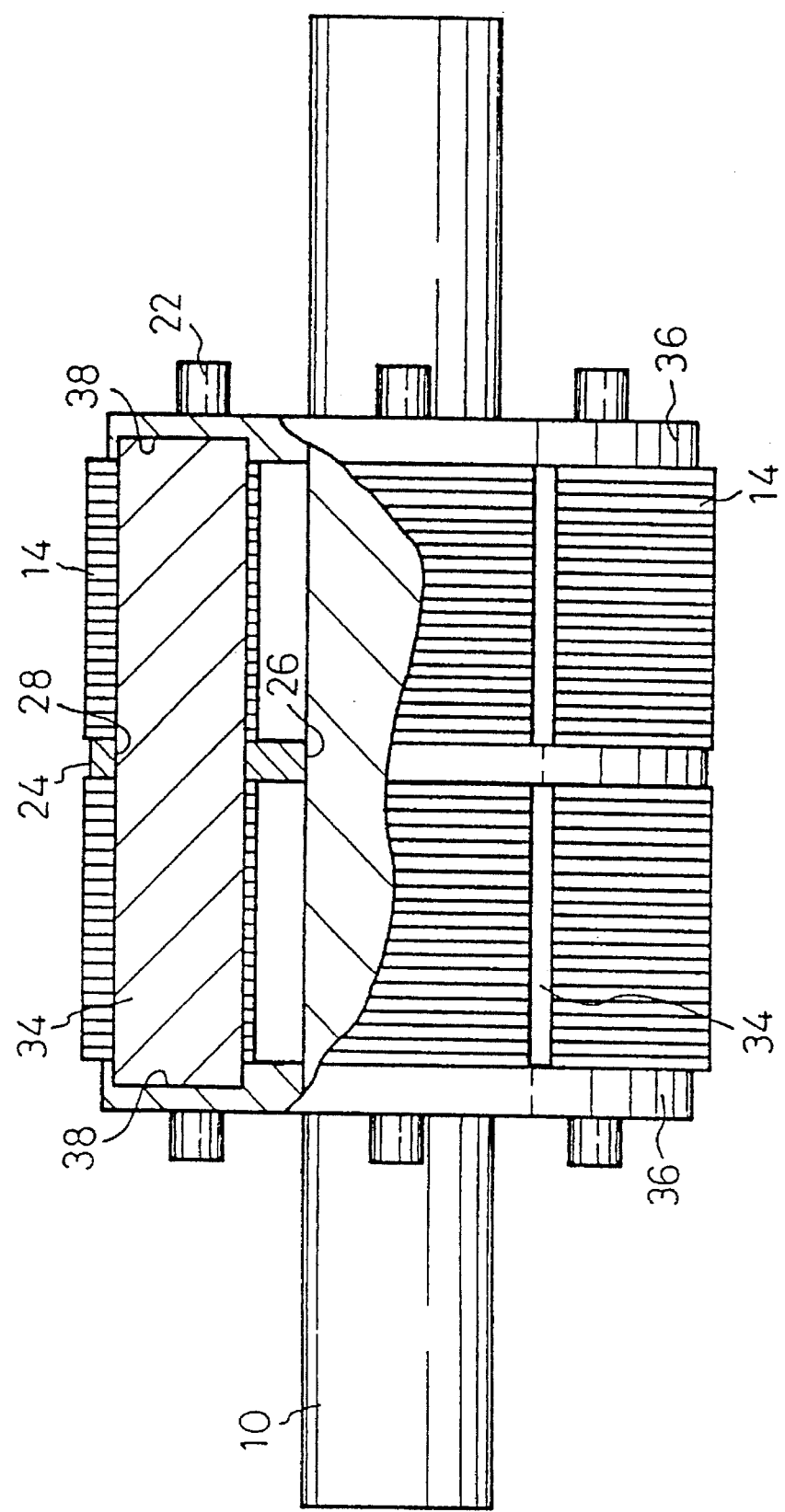
FIG. 4 is a partial sectional side view, similar to FIG. 1, of a rotor according to the second embodiment of the present invention.

Referring to FIG. 4, a rotor according to the second embodiment of the present invention includes, similar to the rotor of the first embodiment, a rotating shaft 10, permanent magnets 34 radially arranged around the rotating shaft 10, laminated core members 14 arranged between adjacent permanent magnets 12, and a circular-plate member 24 disposed at generally the center position of the laminated construction of the laminated core members 14. Each of the permanent magnets 34 has the same cross-sectional shape as that of the permanent magnet 12 of the first embodiment, and a length slightly projecting from the axial both ends of the laminated core member 14. End plates 36 are arranged at the axial both ends of the permanent magnets 34 and the laminated core members 14, and each end plate 36 is provided with a plurality of fastening recesses 38 recessed in the axial direction on the side facing to the laminated core members 14. The fastening recesses 38 have rectangular peripheral edges (not shown) with substantially the same cross-sectional shape as those of the permanent magnets 34, in the same way as the magnet-fastening holes 28 of the circular-plate member 24, and are formed at the positions substantially corresponding to the positions of the permanent magnets 34 in the rotor. Therefore, in the rotor of the second embodiment, the permanent magnets 34 are fastened at the predetermined position in the radial direction, and fixedly supported against the external force acting axially outwardly, such as centrifugal force, by the magnet-fastening holes 28 of the circular-plate member 24 and the fastening recesses 38 of the end plates 36. Note, in this embodiment, the fastening recesses 38 of the end plates 36 may be replaced by holes axially passing through the end plates 36.

Figure 5:
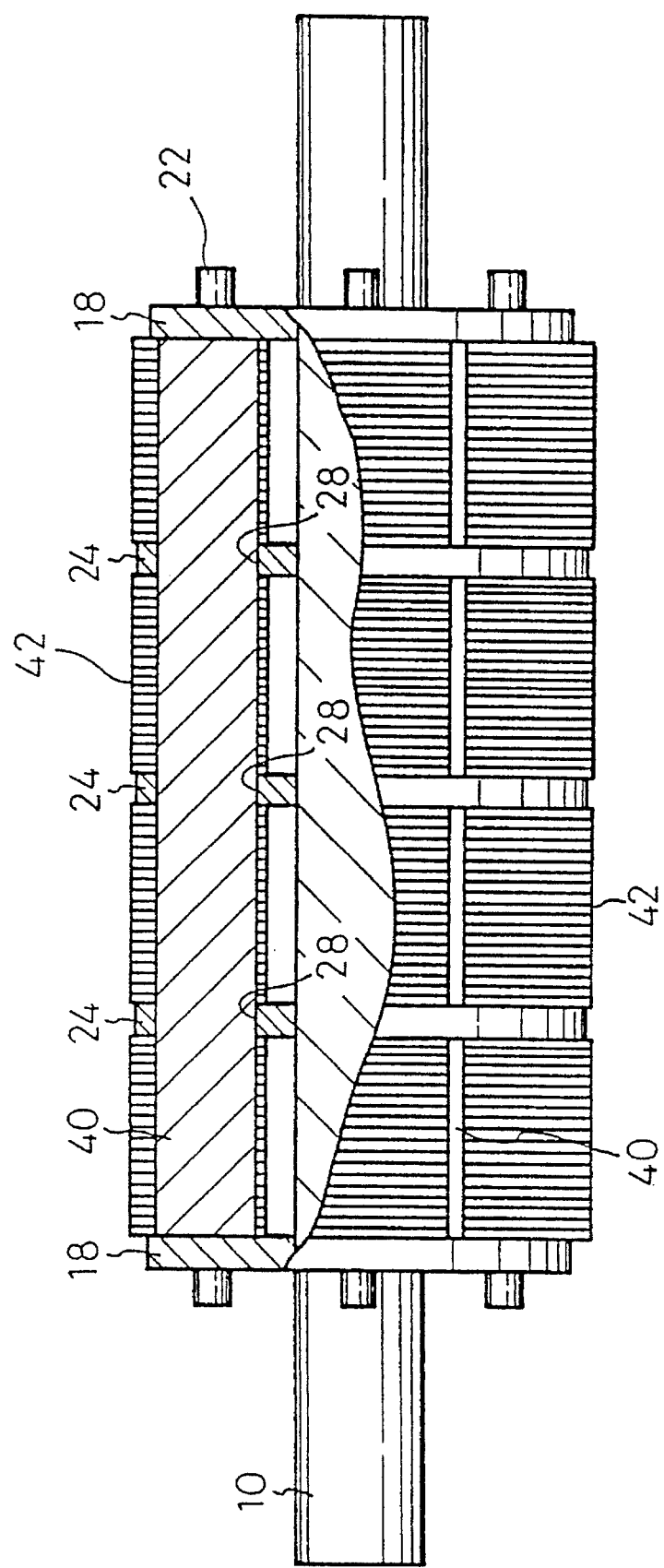
FIG. 5 is a partial sectional side view, similar to FIG. 1, of a rotor according to the third embodiment of the present invention.

Referring to FIG. 5, a rotor according to the third embodiment of the present invention includes permanent magnets 40 and laminated core members 42, each of which has axial length generally twice that of the rotor of the first embodiment. Each of the permanent magnets 40 has the same cross-sectional shape as that of the permanent magnet 12 of the first embodiment, and a length extending along the substantial axial entire length of the laminated core member 42. The circular-plate members 24 are arranged at the positions dividing the laminated construction of the laminated core members 42 into quarters. The permanent magnets 40 pass through the magnet-fastening holes 28 of each circular-plate member 24, and are fastened at the predetermined positions in the radial direction by the magnet-fastening holes 28. Therefore, the permanent magnets 40 are fixedly supported by three circular-plate members 24 against an external force acting axially outwardly, such as centrifugal force.

In the rotor of the third embodiment, the permanent magnets 40 may be divided into two equal parts at generally axial center position thereof, and the end face of each divided part may be butted against each other in the magnet-fastening holes 28 of the circular-plate member 24 arranged at the center of the laminated core members 42. In this manner, by providing the circular-plate member 24 with the magnet-fastening holes 28 through which the permanent magnets pass, the length of the permanent magnet used for the rotor may be freely selected, and as a result, it becomes possible to optimize the manufacturing costs of the high-torque type rotor. Of course, the end plate 36 of the second embodiment may be incorporated into the third embodiment, so as to further improve the fastening function for the permanent magnets.

In the above embodiments, the magnet-fastening holes 28 of the circular-plate member 24 have rectangular peripheral edges 32 with substantially the same profile as a cross-sectional shape of the permanent magnets 12 (34, 40), and are formed at the positions substantially corresponding to the positions of the permanent magnets 12. However, the peripheral edge 32 of each magnet-fastening holes 28 does not always have the same profile as a cross-sectional shape of the permanent magnet 12, and it is only desired that the peripheral edge 32 has at least the portion adapted to abut against the radially outer surface of the permanent magnet 12. In such a case, the permanent magnets 12 can also be fixedly supported by the circular-plate member 24 against an external force acting axially outwardly, such as centrifugal force. In this case, the permanent magnets 12 are supported in the circumferential direction and the radially inward direction by the side surfaces and the inner hooks 16 of the adjacent laminated core members 14.

[Industrial Applicability]

The present invention has a construction in which at least one circular-plate member is arranged at the predetermined position in the laminated construction of the laminated core members, a plurality of magnet-fastening holes, each of which has a peripheral edge portion adapted to abut on at least the radial outer surface of the permanent magnet and into which the magnets are inserted, are formed in the circular-plate member at the positions substantially corresponding to the positions of the permanent magnets in the rotor, and thus the deflection of the permanent magnets in the radial direction is prevented by the peripheral edge portion of the magnet-fastening holes of the circular-plate member. Therefore, even when the outer hooks for holding the permanent magnets cannot be formed on the laminated core members, it becomes possible to fixedly support the permanent magnets against an external force acting axially outwardly, by using the circular-plate member. Consequently, the rigidity of the rotor against particularly the centrifugal force produced by high-speed rotation or the magnetic attraction force is improved, and thus providing the synchronous motor with good balance and high reliability.

I claim:

1. A rotor for a synchronous motor, comprising:

a rotating shaft;

a plurality of permanent magnets radially arranged around said rotating shaft, with a gap between each permanent magnet and said shaft, and extending in an axial direction;

a plurality of laminated core members formed by axially stacking magnetic thin-plate cores, and arranged around said rotating shaft while holding each permanent magnet therebetween so as to constitute magnetic poles;

a pair of end plates arranged at both axial ends of said permanent magnets and said laminated core members, and fixed to said rotating shaft;

a plurality of rod members passing through each of said laminated core members in the axial direction, and connected to said end plates at both ends of the rod members; and a fastening means for fastening said permanent magnets between adjacent laminated core members at predetermined positions in a radial direction;

wherein said fastening means includes at least one non-magnetic circular-plate member arranged at a predetermined position in a laminated construction of said laminated core members; said circular-plate member being provided with a shaft hole into which said rotating shaft is substantially close fitted, rod-supporting holes arranged around said shaft hole, into which said rod members are inserted, and magnet-fastening holes arranged around said shaft hole separate from said shaft hole and said rod-supporting holes, into which said permanent magnets are inserted; said magnet-fastening holes being formed in and passing through said circular-plate member while having peripheral edge portions adapted to abut on at least radial outer and inner surfaces of said permanent magnets at positions substantially corresponding to said permanent magnets.

2. A rotor for a synchronous motor as set forth in claim 1, wherein said circular-plate member is arranged at positions dividing the laminated construction of said laminated core members into some equal parts.

3. A rotor for a synchronous motor as set forth in claim 2, wherein said circular-plate member is arranged at generally center position in the axial direction of the laminated construction of said laminated core members.

4. A rotor for a synchronous motor as set forth in claim 1, wherein said magnet-fastening holes of said circular-plate member have peripheral edges with substantially the same profile as a cross-sectional shape of said permanent magnets perpendicular to an axis of said permanent magnets.

5. A rotor for a synchronous motor as set forth in claim 1, wherein said permanent magnets have a length slightly projecting from both axial end faces of said laminated core members, and said fastening means further includes a plurality of fastening recesses formed in each of said end plates so as to receive end portions of said permanent magnets while defining peripheral walls adapted to abut on at least radial outer surfaces of the end portions, at positions substantially corresponding to each of said permanent magnets.

6. A rotor of a synchronous motor as set forth in claim 1, wherein said fastening means further includes fastening hooks projecting from side surfaces, being in contact with said permanent magnets, of said laminated core members by inner edges of said laminated core members in a circumferential direction.

7. A rotor of a synchronous motor as set forth in claim 1, wherein each of said permanent magnets is formed as a continuum extending along generally axial entire length of said laminated core members.

8. A rotor for a synchronous motor as set forth in claim 1, wherein each of said permanent magnets is divided in each of said magnet-fastening holes of predetermined circular-plate member arranged in said laminated core members.

9. A rotor of a synchronous motor as set forth in claim 1, wherein an impregnent is impregnated into gaps between several components of a rotor core assembly constructed of a combination of said permanent magnets, said laminated core members, said end plates, said rod members, and said at least one circular-plate member.

* * * * *